3,395,119
PROCESS FOR THE PREPARATION OF LINEAR THERMOPLASTIC MIXED POLYESTERS
Franz Blaschke, Witten (Ruhr), and Werner Ludwig, Erlenbach (Main), Germany, assignors to Chemische Werke Witten G.m.b.H., Witten (Ruhr), Germany
No Drawing. Filed June 23, 1964, Ser. No. 377,415
13 Claims. (Cl. 260—47)

ABSTRACT OF THE DISCLOSURE

The present disclosure relates to copolyesters prepared by reacting (a) 2,2-bis(4-hydroxyphenyl) propane with (b) 70–10 mole percent of a diaryl terephthalate, (c) 25–89 mole percent of a diaryl isophthalate and (d) 1–5 mole percent of a diaryl carbonate, said diaryl carbonate present in the reaction mixture in the range of 0.003–0.02 mole per mole of total aryl ester, and removing volatile reaction products until a copolyester having a relative viscosity of greater than 1.6 is obtained, said relative viscosity being measured with 1 gram of said copolyester in 100 ml. of a phenol/tetrachloroethane (60/40) solution at a temperature of 25° C.

Linear polyesters prepared from aromatic dicarboxylic acids, or reactive derivatives thereof, and diphenols have excellent properties and are of great technical interest. Particularly, the polyesters of the readily accessible terephthalic acid, isophthalic acid and mixtures thereof with diphenols, particularly bisphenol A (bis(4-hydroxyphenyl)-2,2-propane) were thoroughly examined and it was found that these polycondensates have high freezing and softening temperatures, excellent thermal stability, good stability against chemical agents and excellent dielectric properties.

Particularly interesting are the mixed polyesters prepared from terephthalic acid, isophthalic acid and bisphenol A which have only a very limited crystalling tendency. These polyesters are, therefore, usually transparent, non-crystalline and extremely tough and, in addition to the aforementioned excellent properties, they have outstanding impact resistance. In these properties, they surpass even the known polycarbonate of bisphenol A.

The aforementioned mixed polyesters are particularly suitable for the preparation of injection-molded and extruded articles as well as other molded bodies. Particularly valuable also are foils prepared from these mixed polyesters by the cast-molding process because of the good solubility thereof in chlorinated hydrocarbons, for example methylene chloride. These foils may be used both as carrier foils and as electrical insulating foils and excel because of their particularly good dimensional stability. Various known processes may be used for the preparation of such polyesters. Thus, it is possible to prepare polyesters by reacting the dicarboxylic acids with the diacetates of the diphenols, but only darkly-colored, brittle products are thereby obtained.

It is also known to heat dicarboxylic acid dichlorides with bivalent phenols in organic solvents whereby solutions of the corresponding polyesters are formed while hydrogen chloride is split-off. The polyesters must be isolated in a complicated manner by additional working steps, such as precipitating, filtering and drying. Moreover, working with the delicate acid chlorides requires anhydrous conditions. The splitting-off of hydrogen chloride causes additional technical difficulties.

An additional possibility is the use of interface or contact condensation in which solutions of dicarboxylic acid halides in organic solvents immiscible with water are reacted with solutions of alkali salts of bivalent phenols. Polymers are formed at the interfacial area of the two phases, which are immiscible with each other, while alkali halide is split-off. This process is of little usefulness for technical purposes as large quantities of solvent are required if high degrees of condensation are to be obtained. Reproducibility is hardly possible despite the fact that the reaction variables are maintained constant.

The ester radical interchange of the dicarboxylic acid diaryl esters with diphenols, if desired in the presence of ester radical interchange catalysts, is a process which has technical significance for the preparation of the aforementioned polyesters. Basic substances, for example, oxides, hydroxides, hydrides, amides and phenolates of the alkali and alkaline-earth metals as well as ZnO, PbO, and $Sb_2O_3$, are recommended as ester radical interchange catalysts. If precisely equimolecular amounts of terephthalic acid diaryl esters and isophthalic acid diaryl esters are reacted with bisphenol A, usable polyaryl esters may be obtained by means of melting condensation. The obtainable molecular weight, which is decisive for obtaining the desired properties, is, however, always dependent on how accurately the coordination or matching of the starting materials can be made. The diaryl esters of terephthalic acid and isophthalic acid are extremely difficultly volatile, as is bisphenol A, so that any excess of these components cannot be completely removed and the result is a low molecular weight unusable polyester caused by chain breakage. Moreover, excess bisphenol A causes a strong discoloration of the polyester melt because of the thermal instability thereof at the high condensation temperatures employed.

It has now been found that these disadvantages may be effectively avoided if the mixed polyesters are prepared in a manner such that (bis-(4-hydroxy-phenyl)-2,2-propane) is heated with 70–10 mole percent of a diaryl terephthalate, 25–89 mole percent of a diaryl isophthalate and 1–5 mole percent of a diaryl carbonate, the latter (diaryl carbonate) being present in the reaction mixture in the range of 0.003 to 0.02 mole per mole of total aryl esters and, if desired, in the presence of known ester radical interchange catalysts, while volatile reaction products are removed, until a polyester having a relative viscosity of $>1.6$ is formed.

One advantage of the present invention resides in the greater volatility of the diaryl carbonates as the excess portion thereof may be easily removed in vacuo at the polycondensation temperature. Since the diaryl carbonate is employed in excess, i.e., above the quantity to be reacted, it is possible to compensate, on the one hand, for a low quantity of terephthalic acid and an isophthalic acid diaryl ester excess and, on the other hand, for a small excess of bisphenol A. In the first case, both the excess diaryl carbonate and a portion of the diaryl carbonate intended for reaction are removed during the polycondensation and thus equivalence is reestablished between the dihydroxy component and the ester components. The resulting polyester thereby contains less carbonic acid than had been anticipated during the calculation.

In the presence of excess bisphenol A, the diaryl carbonate excess is used to compensate therefor. The polyester contains in such case slightly more carbonic acid than had been anticipated and used as a basis for the calculated quantity.

The present invention thus provides a process for the preparation of terephthalic acid-isophthalic acid-bisphenol A mixed polyesters modified with carbonic acid which is dependable in actual operation.

The mixed polyesters of bisphenol A with 70–10 mole percent of terephthalic acid, 25–89 mole percent isophthalic acid and 1–5 mole percent carbonic acid prepared in accordance with the present invention are high molecular weight, non-crystalline, extremely tough products which have high freezing and softening temperatures as well as excellent thermal and dimensional stability. They are particularly suitable as injection-molding materials and for use in the preparation of foils and coatings.

The relative solvent viscosity of the polyesters should be at least 1.6 in order to obtain optimum properties. The determination of the relative solvent viscosity is made by measuring the viscosity of a 1 percent polymer solution (1 g. polymer in 100 ml. solution) in phenol/tetrachloroethane (60/40) at a temperature of 25° C.

The softening temperature is determined in accordance with the penetrometer method and the softening point is defined as that temperature at which a needle under load (total load 350 g., needle base 1 mm.²) penetrates into a test object a distance of 0.1 mm.

The invention will be further illustrated by reference to the following specific examples:

Example 1

Mixed polyester from bisphenol A and 50 mole percent diphenyl terephthalate/45 mole percent diphenyl isophthalate/5 mole percent diphenyl carbonate.

A mixture of 31.8 g. (0.1 mole) of diphenyl terephthalate, 28.62 g. (0.09 mole) of diphenyl isophthalate and 2.37 g. (0.011 mole) of diphenyl carbonate is ester radical interchanged at a temperature of 180° C. with 45.6 g. (0.2 mole) of bisphenol A in the presence of 64 mg. of $Sb_2O_3$ while purging with nitrogen. After three hours, the temperature is increased to 230° C. for one hour, then to 250° C. for one hour, and the reaction is continued with distillation of phenol. The temperature is then raised to 310° C. and the condensation vessel is evacuated. Under a vacuum of 0.2 torr., the polycondensation continues very rapidly with a strong increase in the viscosity of the melt and the reaction is terminated after one hour.

A slightly brownish, extremely tough, non-crystalline polyester is obtained having the following characteristics:

Relative viscosity _____ 1.75
Softening point _____° C__ 200
Melting range _____° C__ 215–285

Comparative example.—31.8 g. (0.1 mole) of diphenyl terephthalate and 31.8 g. (0.1 mole) of diphenyl isophthalate were ester radical interchanged and polycondensed, in the presence of 63 mg. of $Sb_2O_3$, with 45.6 g. (0.2 mole) of bisphenol A under the conditions of Example 1.

A brownish, non-crystalline, somewhat brittle polycondensate was obtained having the following characteristics:

Relative viscosity _____ 1.56
Softening point _____° C__ 167
Melting range _____° C__ 182–265

Example 2

Mixed polyester from bisphenol A and 40 mole percent terephthalic acid/58 mole percent isophthalic acid/2 mole percent carbonic acid.

A mixture of 25.44 g. (0.08 mole) of diphenyl terephthalate, 36.89 g. (0.116 mole) of diphenyl isophthalate and 1.498 g. (0.007 mole) of diphenyl carbonate are ester radical interchanged at a temperature of 180° C. with 45.6 g. (0.2 mole) of bisphenol A in the presence of 32 mg. of $Sb_2O_3$ while purging with nitrogen. After three hours, the temperature is increased to 230° C. and reaction is continued under a vacuum of 100 torr. while phenol distills off. In order to produce a high molecular weight polyester, the temperature is increased to 310° C. after two hours and the pressure is slowly reduced to 0.2 torr. A high molecular weight polyester was obtained in a period of 1.5 hours with a large increase in the melting viscosity. The polyester had the following characteristics:

Relative viscosity _____ 1.79
Softening point _____° C__ 187
Melting range _____° C__ 222–287

Comparative example.—A mixture of 25.44 g. (0.08 mole) of diphenyl terephthalate and 38.16 g. (0.12 mole) of diphenyl isophthalate were reacted with bisphenol A under the conditions of Example 2 in the presence of 32 mg. of $Sb_2O_3$.

A yellow polycondensate was obtained having the following characteristics:

Relative viscosity _____ 0.63
Softening point _____° C__ 178
Melting range _____° C__ 189–267

Example 3

Mixed polyester from bisphenol A and 30 mole percent terephthalic acid/65 mole percent isophthalic acid/5 mole percent carbonic acid.

19.08 g. (0.06 mole) of diphenyl terephthalate, 41.34 g. (0.13 mole) of diphenyl isophthalate and 2.37 g. (0.011 mole) of diphenyl carbonate are ester radical interchanged at a temperature of 180° C. with 45.6 g. (0.2 mole) of bisphenol A in the presence of 60 mg. of $Sb_2O_3$ while purging with nitrogen. After three hours, the temperature is increased to 230° C. for one hour, then to 250° C. for one hour, and the reaction is continued with distillation of phenol. The temperature is then increased to 310° C. and the condensation vessel is evacuated. The polycondensation is completed within one hour under a vacuum of 0.2 torr.

A slightly yellowish, extremely tough polyester was obtained having the following characteristics:

Relative viscosity _____ 1.76
Softening point _____° C__ 181
Melting range _____° C__ 215–288

Comparative example.—19.08 g. (0.06 mole) of diphenyl terephthalate and 44.52 g. (0.14 mole) of diphenyl isophthalate were ester radical interchanged and polycondensed in the presence of 60 mg. of $Sb_2O_3$ with 45.6 g. (0.2 mole) of bisphenol A following the procedure of Example 3.

A yellow brittle polycondensate was obtained having the following characteristics:

Relative viscosity _____ 1.493
Softening point _____° C__ 165
Melting range _____° C__ 180–251

It will be obvious to those skilled in the art that many modifications may be made within the scope of the present invention without departing from the spirit thereof, and the invention includes all such modifications.

What is claimed is:

1. A process for the preparation of a linear thermoplastic mixed polyester which comprises reacting a mixture consisting essentially of (a) 2,2 - bis(4 - hydroxyphenyl) propane with (b) 70–10 mole percent of a diaryl terephthalate, (c) 25–89 mole percent of a diaryl isophthalate and (d) 1–5 mole percent of a diaryl carbonate, said diaryl carbonate present in the reaction mixture in the range of about 0.003–0.02 mole per mole of total aryl ester, and removing volatile reaction products until a copolyester having a relative viscosity of greater than 1.6 is obtained, said relative viscosity being measured with 1 gram of said copolyester in 100 ml. of a phenol/tetrachloroethane (60/40) solution at a temperature of 25° C.

2. A process according to claim 1 in which the reaction is conducted at an elevated temperature.

3. A process according to claim 1 in which the reaction is conducted under subatmospheric pressure.

4. A process according to claim 1 in which the reaction is conducted in the presence of an ester radical interchange catalyst.

5. A process according to claim 1 in which the diaryl terephthalate is diphenyl terephthalate.

6. A process according to claim 1 in which the diaryl isophthalate is diphenyl isophthalate.

7. A process according to claim 1 in which the diaryl carbonate is diphenyl carbonate.

8. A process according to claim 4, in which said ester radical interchange catalyst is a basic compound.

9. A process according to claim 4, in which said ester radical interchange catalyst is $Sb_2O_3$.

10. A process according to claim 1, in which the diaryl esters are the diphenyl esters.

11. A process according to claim 10, in which the reaction is carried out at temperatures of from approximately 180° C. to approximately 310° C.

12. A process according to claim 1 in which the reaction is commenced at approximately 180° C.

13. A process according to claim 1, in which the reaction is completed at approximately 310° C.

References Cited

UNITED STATES PATENTS

| 3,000,849 | 9/1961 | Clachan et al. | 260—47 |
| 3,161,615 | 12/1964 | Goldberg | 260—47 |
| 3,169,121 | 2/1965 | Goldberg | 260—47 |
| 3,207,814 | 9/1965 | Goldberg | 260—47 |

FOREIGN PATENTS

| 870,095 | 6/1961 | Great Britain. |
| 1,354,473 | 1/1964 | France. |

WILLIAM H. SHORT, *Primary Examiner.*

L. P. QUAST, *Assistant Examiner.*